(12) United States Patent
Hsiao et al.

(10) Patent No.: US 7,832,885 B2
(45) Date of Patent: Nov. 16, 2010

(54) PATTERNED WAVELENGTH CONVERTING STRUCTURE

(75) Inventors: Chun-Chung Hsiao, Caotun Township, Nantou County (TW); Hsin-Tao Huang, Zhubei (TW)

(73) Assignee: Kismart Corporation, Taipei (TW)

( * ) Notice: Subject to any disclaimer, the term of this patent is extended or adjusted under 35 U.S.C. 154(b) by 339 days.

(21) Appl. No.: 12/026,040

(22) Filed: Feb. 5, 2008

(65) Prior Publication Data

US 2009/0196014 A1 Aug. 6, 2009

(51) Int. Cl.
*F21V 9/16* (2006.01)
(52) U.S. Cl. .............. 362/84; 362/97.1; 362/97.2; 362/217.09; 349/71
(58) Field of Classification Search ............ 362/84, 362/97.1, 97.2, 217.08, 217.09, 260; 349/71
See application file for complete search history.

(56) References Cited

U.S. PATENT DOCUMENTS

| 7,018,059 | B2 | 3/2006 | Yu et al. ................ 362/29 |
| 7,172,331 | B2 | 2/2007 | Kuo et al. .............. 362/634 |
| 7,290,921 | B2 | 11/2007 | Lin ...................... 362/625 |
| 7,391,571 | B2 * | 6/2008 | Lee et al. ............. 362/97.1 |
| 2008/0002391 | A1 * | 1/2008 | Lee ...................... 362/97 |

* cited by examiner

*Primary Examiner*—Stephen F Husar
(74) *Attorney, Agent, or Firm*—Kusner & Jaffe

(57) ABSTRACT

The present invention provides a patterned wavelength converting structure comprising a frame, a light source, a substrate, a film, a wavelength converting layer and a pattern disposed on the film. The pattern and the wavelength converting layer can be one piece. The configuration, for example, the distribution of diffusion particles, the location, the shape or the thickness, of the pattern is configured to reduce the mura or affect the desired uniformity of a lighting area.

21 Claims, 5 Drawing Sheets

PATTERNED WAVELENGTH CONVERTING STRUCTURE

FIELD OF THE INVENTION

The present invention relates to a wavelength converting structure and more particularly to a patterned wavelength converting structure for reducing mura or for affecting mura distribution of a lighting area.

BACKGROUND OF THE INVENTION

Taking a cold cathode fluorescent lamp CCFL as a light source has the shortcomings as below. The CCFL emits light with wavelength 185 nm which causes a new absorptive spectrum band and the brightness of emitting light degrades with time; the recombination of $Hg^+$ and the other ions at the tube wall disrupts the lattice structure of the phosphor layer exaggerating the brightness degradation of the emitting light. Moreover, for CCFL, the phosphor coating and the light emitting source have to be disposed in the same vacuum lamp tube, and therefore it is difficult to produce large-sized lamps and to provide a wavelength conversion structure with large emitting area only by CCFL. Another disadvantage is that the phosphor coating mentioned above is uneven in most cases. Therefore, the light emitted by the CCFL suffers the problem of non-uniformity.

Other light sources, including external electrode fluorescent lamps (EEFL), light emitting diodes (LED), carbon nanotubes (CNT), flat fluorescent lamps (FFL), and organic light emitting displays (OLED) are either immature for production (e.g., LED, CNT, OLED and FFL) or inapplicable for large-size applications. More importantly, being a flat light source, these existing light sources are expensive and complex.

The light sources mentioned above are line source or point source. If the distance between the light sources mentioned above is too far or the distance between the light source and a diffusion plate or a guiding plate is too narrow, a phenomenon called "mura" appears or becomes exaggerated. Mura effect is a problem that should be paid attention to while utilizing the traditional light sources listed above for producing a light source with uniformity. Mura effect here means the luminance difference of a lighting area. The phenomenon may be caused by reflection of incident light, interaction of light field, position of the light sources, for example, interference of light, luminance distribution, or both.

FIG. 1 discloses a flat light source 1 having a light emitting layer 11, a diffusion plate 12 for diffusing the incident light, lamps 13 and other optical structures 14. The flat light source 1 is designed for providing emitting light with lowered mura. Referring to FIG. 2, the non-uniformity ratio of the emitting light provided by the flat light source is lowered while the diffusion angle is lower than about 150 degree, but the emitting light provided by such a flat light source still suffers from undesired mura effect.

To provide a light source with less mura, the traditional way is to provide a diffusion plate or an optical structure with ink printed on the surface. Both solutions lower the luminance of emitting light, and the latter solution also requires aligning the position of ink with the light source with high precision.

Many inventions have been provided, too. Some inventions relate to improving the optical character of the diffusion plate. U.S. Pat. No. 7,290,921 provides a light guide plate with sub-scattering-dots for producing uniform emitting light. The technical feature of this invention is providing scattering-dots and sub-scattering-dots at a predetermined region on the bottom surface of said light guide; wherein at least one sub-scattering-dot is disposed around each scattering-dot and the sub-scattering-dots are smaller than the scattering-dots. U.S. Pat. No. 7,018,059 provides a direct type backlight module; wherein, a diffuser plate disposed on the reflector, and the lamps are disposed between the reflector and the diffuser plate. This invention provides a light-distributing device to inhibit mura effect. The light distributing device is a prism plate, a metallic adhesive layer with a plurality of holes or a light guide plate with various indexes of refraction thereon.

Some inventions provide improvement of the surface character. U.S. Pat. No. 7,172,331 provides a direct type backlight module having a holding structure for holding a reflector on a frame, instead of using an adhesive to prevent roughness and unevenness in the reflector's surface when the reflector is attached onto the surface of the frame.

In view of the above, no invention has been found relating to controlling the mura of a lighting area by manipulating the configuration of a wavelength converting structure. Therefore, a patterned wavelength converting structure is disclosed herein.

SUMMARY OF THE INVENTION

One advantage of the present invention is providing a patterned wavelength converting structure for affecting mura distribution of a lighting area.

Another advantage of the present invention is providing a patterned wavelength converting structure with a pattern for reducing mura of a lighting area.

Another advantage of the present invention is providing a patterned wavelength converting structure with lower cost, and preventing undesired warping of the structure.

DESCRIPTION OF THE PREFERRED EMBODIMENT

The invention will now be described in greater detail with preferred embodiments of the invention and illustrations attached. Nevertheless, it should be recognized that the preferred embodiments of the invention are only for illustration. Besides the preferred embodiments mentioned here, the present invention can be practiced in a wide range of other embodiments besides those explicitly described, and the scope of the present invention is expressly not limited by the embodiments but determined by the accompanying claims.

The description hereafter relates to embodiments of the present invention. Some structure and functional details of the patterned wavelength converting structure are described in U.S. patent application Ser. No. 11/940,845 "Flat Converting Structure and Manufacture and Use of the Same" fully incorporated herein by reference in its entirety.

Figure 1:
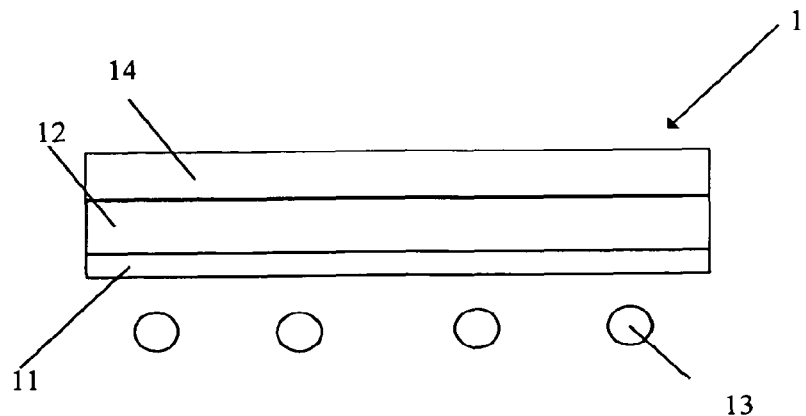
FIG. 1 illustrates a cross-sectional view of a flat wavelength converting structure.
Figure 2:
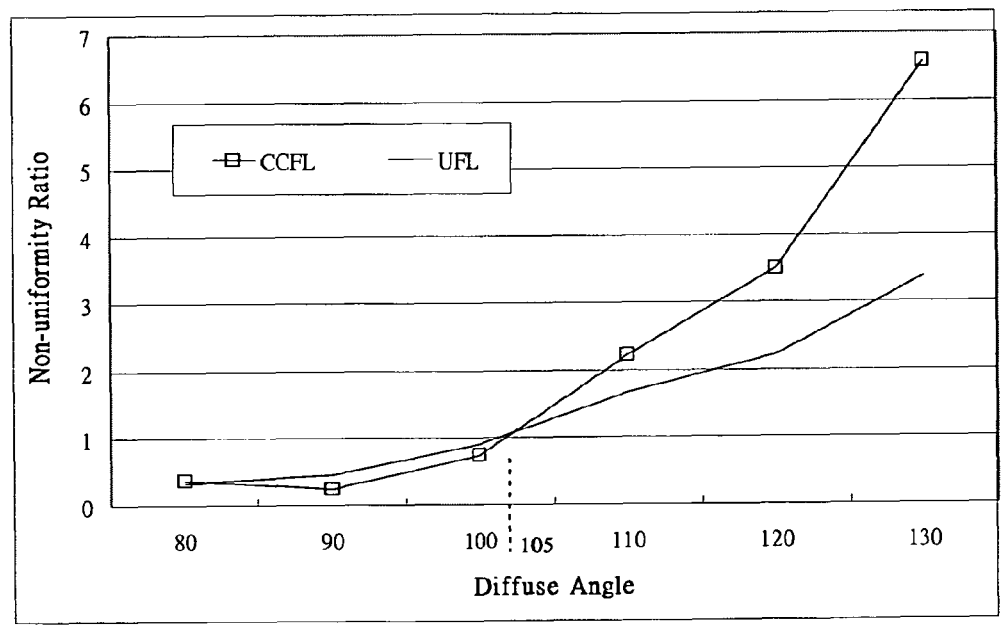
FIG. 2 illustrates the non-uniformity ratio of the emitting light of the flat light source and the CCFL.
Figure 3:
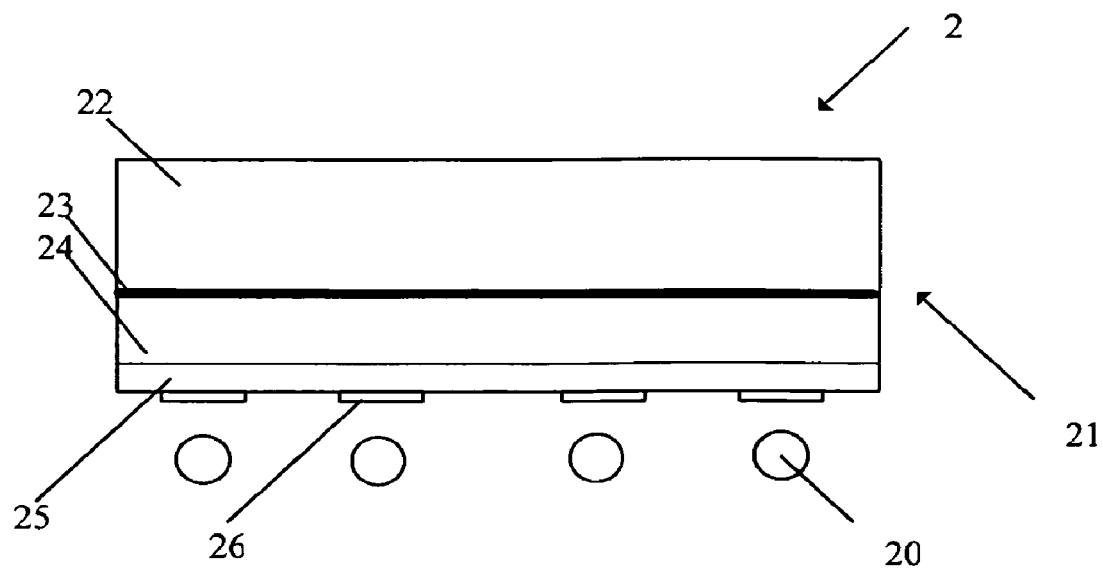
FIG. 3 illustrates a cross-sectional view of a wavelength converting structure with pattern.

FIG. 3 discloses a flat light source 2 including a light source 20 disposed inside a frame (not shown) and a patterned wavelength converting structure 21 for producing light with low mura. The light source 20 is for providing incident light to the patterned wavelength converting structure 21. In one embodiment, the light source 20 is an UVc lamp, where UVc denotes the wavelength ranges no more than 280 nm. In another embodiment, the range of the wavelength falls between 200 nm to 280 nm, and, more particularly, from 250 nm to 260 nm; the preferred wavelength being 253.7 nm. In another embodiment, the light source 20 emits light other than UVc light, e.g., the light source 20 is an LED or other lighting device, as long as the emitting light is suitable for the corresponding converting structure 21 to provide light with the aimed wavelength.

The patterned wavelength converting structure 21 includes a substrate 22, an adhesive layer 23, a film 24 that sticks on the substrate 22 by adhesive layer 23, and a wavelength converting layer 25 for converting the wavelength of incident light into the aimed wavelength and producing a uniform lighting area, a pattern 26 for further reducing mura effect. In one embodiment, the wavelength converting layer 25 is the phosphor layer disclosed by U.S. patent application Ser. No. 11/940,845. In a preferred embodiment, the wavelength converting layer 25 is a layer of phosphor excitable by UVc light to provide visible light.

Figure 4:
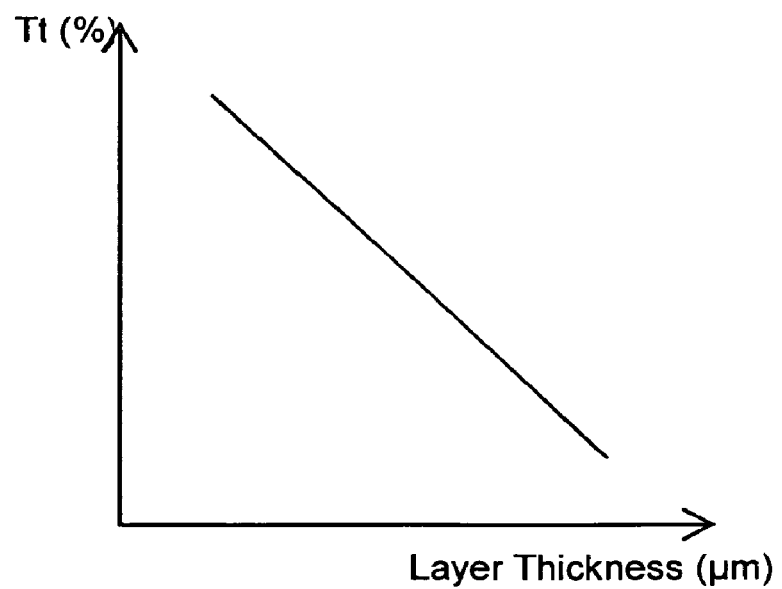
FIG. 4 illustrates the relation of the thickness of the material with the transmittance of light.
Figure 5:
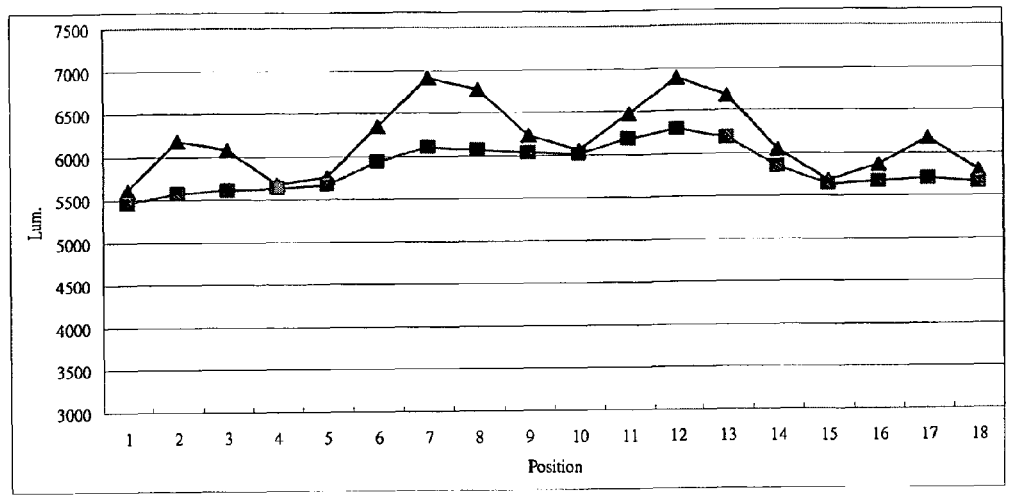
FIG. 5 illustrates the luminance difference of the emitting light before and after the pattern is formed.

The pattern 26 is a strip structure made of a material with uniform density of diffusion particles and aligns to the light source 20; wherein the transmittance of light is inverse proportional to the thickness of the material according to FIG. 4. FIG. 5 illustrates the luminance difference of the emitting light before and after the pattern 26 is formed. According to FIG. 5, the luminance difference drops after the pattern 26 is formed; wherein ▲ denotes the luminance distribution of the light emitted by the converting structure and ■ denotes the luminance distribution of the light emitted by the converting structure with pattern 26.

The description hereafter discloses other embodiments but not limiting. Referring to FIG. 3 again, the converting structure 21 is for, but not limited to, converting the wavelength of the incident light into the emitting light with the aimed wavelength, for guiding the incident light and for acting as a planar light source emitting uniform light.

The patterned wavelength converting structure 21 is a composite structure comprising a substrate 22, an adhesive layer 23, a film 24 that sticks on the substrate 22 by adhesive layer 23, a wavelength converting layer 25 for converting the wavelength of incident light into aimed wavelength and producing uniform lighting area, a pattern 26 for further reducing mura effect of lighting area.

In one embodiment of the present invention, the pattern 26 can be made by a photo luminescent material, a fluorescent color-conversion-media, an organic complex material, a luminescent pigment(s), a quantum dots-based material, a quantum wire-based material, or a quantum well-based material or the combination thereof, as long as the materials of the converting structure are suitable for converting incident light into aimed wavelength.

The wavelength converting layer 25 disclosed by the present invention is also a layer with the pattern 26 for reducing mura effect; that is, the surface of the wavelength converting layer 25 is arranged with a specially arranged contour, profile or patterns at a specific area to acquire a uniform lighting area.

The pattern 26 means the patterns of the patterned wavelength converting layer 25, a structure or printed pattern formed on the wavelength converting layer 25, or the combination thereof for reducing mura effect. In a preferred embodiment, the pattern and the wavelength converting layer is formed in one piece; for example, the wavelength converting layer and the pattern formed thereon is printed or coated on the film. Because the structure is formed without curing, compared with the optical structure having a pattern formed thereon by printing, the structure disclosed by the present invention has the benefit of forming without undesired warping.

The configuration of the pattern 26 aims to reducing mura effect. In one embodiment, the pattern 26 is arranged according to the mura distribution of the lighting area and/or the distribution of the light sources. In another embodiment, the thickness of the pattern 26 at the specific area is determined according to the luminance at that area for producing a uniform lighting area. In another embodiment, the thickness of the material of the pattern 26 is inverse proportional to the transmittance of light according to FIG. 4. In another embodiment, the shape of the pattern 26 at specific area is another factor for providing a lighting area with low mura; for example, the shape of the pattern 26 can be an area with uniform composition, an area formed by multiple mesh points, or a combination thereof.

Material of the pattern 26 is another factor for providing a uniform lighting area. In one embodiment, the material of the pattern 26 is the same as the wavelength converting layer 25. In another embodiment, the material of pattern 26 is the same material as that of the substrate 22 or other materials suitable for diffusing incident light. In another embodiment, the mura effect of the lighting area is controlled by the characters of the material forming the pattern 26; for example, in one embodiment, the transmittance of light is determined by the density of the diffusion particle at that area. In another embodiment, the characters may comprise the reflective index, the transparency or other optical characters relating to the diffusion effect of the incident light.

The pattern 26 can also be a combination structure to provide a lighting area with lowered mura. In another embodiment, the pattern 26 is an optical structure with multiple layers and each layer is not necessarily the same. In another embodiment, the wavelength converting structure can be divided into several regions with different materials, patterns, refractive index, other optical characters relating to luminance of light or combination thereof according to the embodiment.

Figure 6:
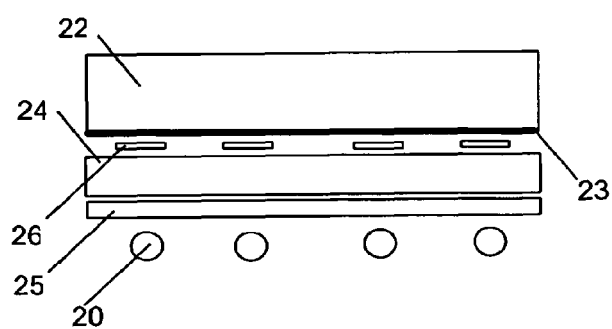
FIG. 6 illustrates the location of the pattern.
Figure 7:
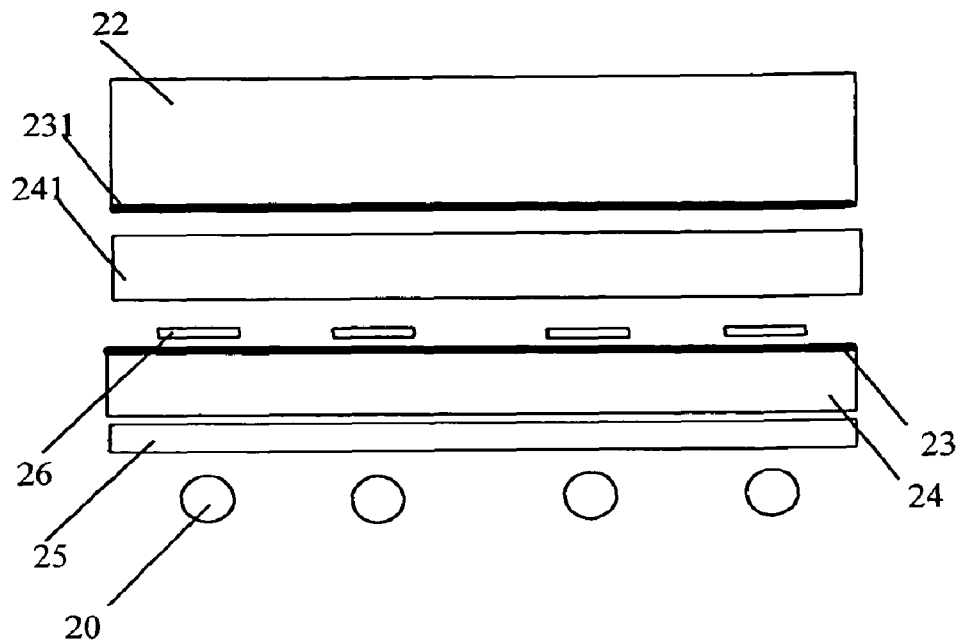
FIG. 7 illustrates the location of the pattern.
Figure 8:
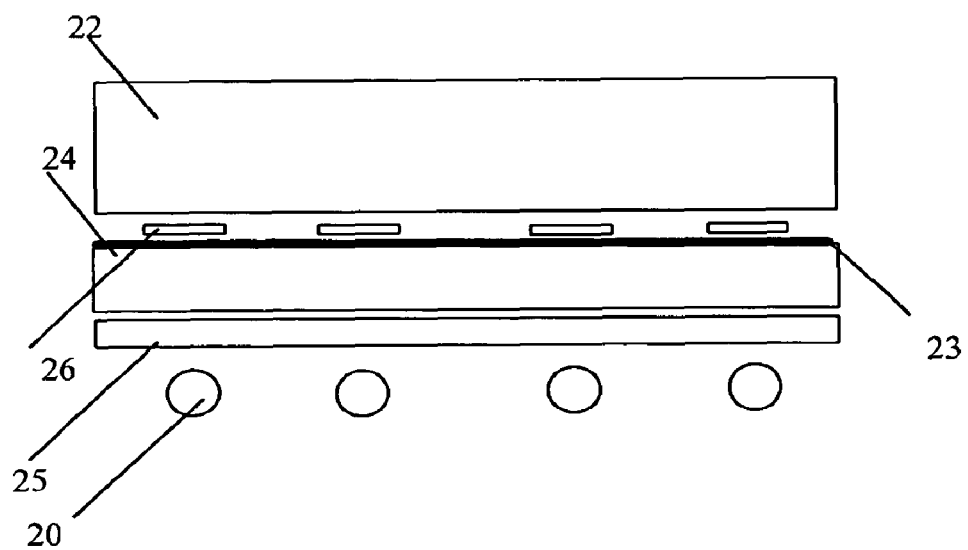
FIG. 8 illustrates the location of the pattern.

According to the FIGS. 6-8, the location of pattern 26 in the converting structure 21 is another factor relating to the uniformity of a lighting area. In FIG. 3, the pattern 26 is an optical structure attached to the surface of wavelength converting layer 25. In FIGS. 6-10, 20 is the light source. In FIG. 6 the pattern 26 is formed on the surface of film 24 opposite to the surface that the wavelength converting layer 25 is disposed on, and covered by the substrate 22; wherein an adhesive layer 23 is applied between the substrate 22 and the film 24.

In FIG. 7, the pattern 26 is formed on the lower surface of the film 241 and the upper surface of the film 241 is fixed on the substrate 22 via adhesive layer 231. The film 24 with the wavelength converting structure 25 disposed thereon is fixed on the lower surface of the film 241 via adhesive layer 23.

In FIG. 8, the wavelength converting layer 25 is formed on the lower surface of the film 24. The pattern 26 is formed on the substrate 22 and covered by the film 24. The film 24 with the wavelength converting structure 25 disposed thereon is fixed on the lower surface of the substrate 22 via adhesive layer 23.

Figure 9:
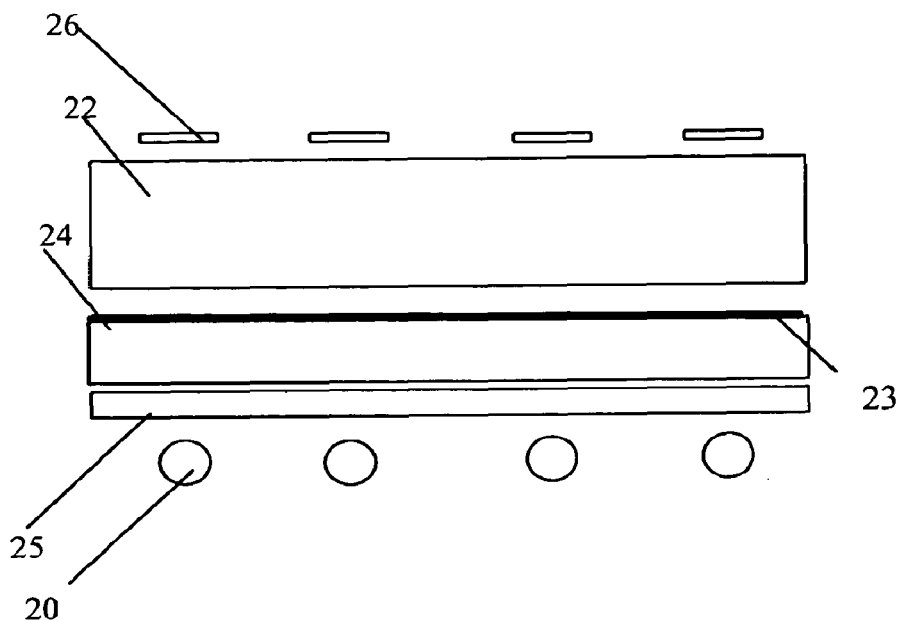
FIG. 9 illustrates the location of the pattern.

FIG. 9 illustrates another embodiment of the present invention. The wavelength converting layer 25 is formed on the lower surface of the film 24. The pattern 26 is fixed on the upper surface of the substrate 22, and the film 24 with the wavelength converting structure 25 disposed thereon is fixed on the lower surface of the substrate 22 via adhesive layer 23.

Figure 10:
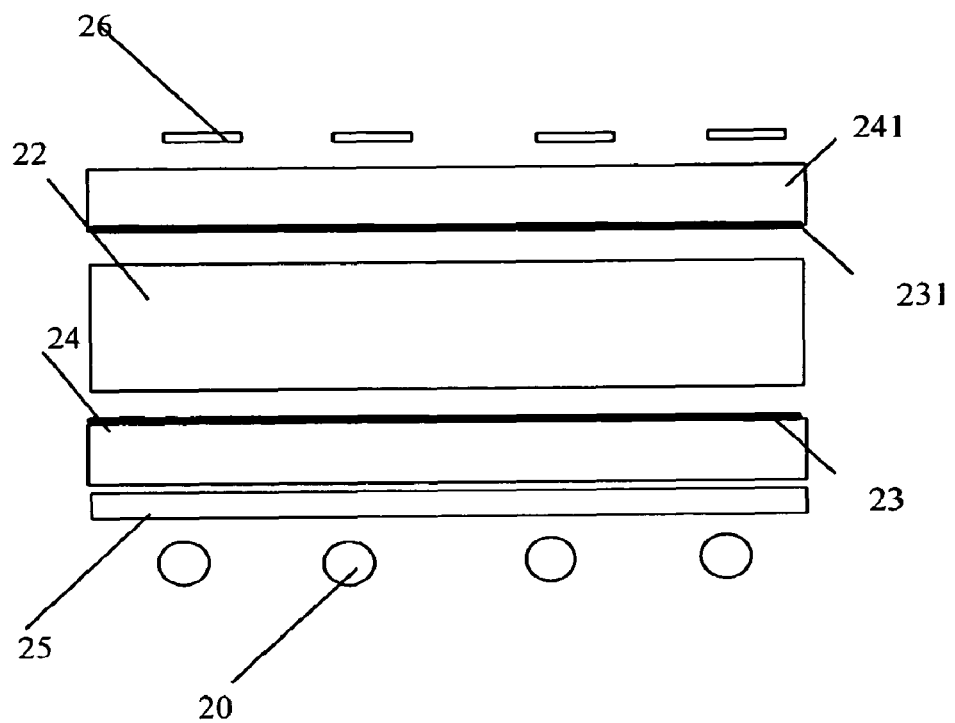
FIG. 10 illustrates the location of the pattern.

FIG. 10 illustrates another modification of the present invention. The wavelength converting layer 25 is formed on the lower surface of the film 24, and the upper surface of the film 24 is attached on the lower surface of the substrate 22 via an adhesive layer 23. Another film 241 is attached on the upper surface of the substrate 22. An adhesive layer 231 is applied between the substrate 22 and the film 241. The pattern 26 is disposed on the upper surface of the film 241 without adhesive.

Referring to FIG. 3 again, the present invention also discloses a wavelength converting layer 25 with pattern 26 for providing a lighting area with required mura effect. The configuration of pattern 26 is arranged according to the mura distribution of a lighting area. In one embodiment the material thickness, shape, location or the combination thereof of pattern 26 at a specific area is determined according to the luminance at that area for obtaining emitting lighting area specific mura pattern. For example, the thickness of pattern 26 is variant for producing a lighting area with required mura effect correspondent to the thickness of the pattern 26. In another embodiment, the characteristics of the material relating to luminance of a lighting area may comprise density, reflective index, the transparency, or other optical characters are other factors for providing a lighting area with required mura.

The pattern 26 can also be a combination structure to provide required mura effect, for example, the pattern 26 can be an optical structure with multiple layers and each layer is not necessarily the same.

The pattern 26 can also be formed according to the range of tolerable mura effect, which means the configuration, for example, the thickness, shape, location or any combination thereof of the pattern 26 may not exactly be determined by the distribution of mura distribution of a lighting area, as long as the pattern 26 can produce light with the required mura effect. In another embodiment, the mura of a lighting area is controlled by the characteristics of the material forming the pattern 26, for example, the reflective index, the density, or other optical characters relating to the diffusion effect of light.

The adhesive layer 23 disclosed by the present invention is a macromolecular material. In another embodiment, the preferred adhesive is an anti-UVC material for preventing the yellowing of the wavelength converting coating and the degradation of the adhesive itself. The material of the adhesive layer is disclosed in U.S. patent application Ser. No. 11/940,845 fully incorporated herein by reference.

The patterned wavelength converting structure disclosed by the present invention also comprises optical structures for changing the optical property of the emitting light, for example, the uniformity, brightness, polarization or any combination thereof. The optical structure may comprise any appropriate optical elements, for example, a prism, an optical film or sheet such as a diffusion plate, a diffusion film, a brightness enhancement film (BEF), a dual brightness enhancement film (DBEF), a prism plate, a lenticular film, a polarizer, a diffusion plate with screen printing or any combinations thereof.

The present embodiment also discloses a UV-blocking coating which is disclosed in U.S. patent application Ser. No. 11/940,845 fully incorporated herein by reference.

In another embodiment, the present invention also discloses a patterned wavelength converting structure comprising a frame, a light source disposed inside the frame; a substrate disposed above the light source, a film disposed on the substrate, a converter disposed on the film comprising a wavelength converting layer and a pattern formed on the surface of the wavelength converting layer for producing the desired mura or reducing mura at a lighting area. The patterned wavelength converting structure disclosed by the present invention also comprises optical structures for changing the optical property of the emitting light.

The present invention also discloses a method for forming patterned wavelength converting structure disclosed herein.

The present invention discloses a method for forming a light source including an UVc lamp and a wavelength converting layer excitable by UVc light to provide the desired emitting light. In one embodiment, the wavelength converting layer comprises a phosphor layer. The process for forming a phosphor layer is disclosed by U.S. patent application Ser. No. 11/940,845 "Flat converting structure and Manufacture and Use of the Same" fully incorporated herein by reference in its entirety.

Because the material of the film is flexible, the phosphor layer is applied on the substrate plate by coating; for example, dip coating, comma coating, spraying coating, spin coating, slot coating, curtain coating, gravure coating, or meyer rod coating. Alternatively, the phosphor layer can also be applied by printing, tapping, molding, or inject molding.

The pattern and the wavelength converting layer is formed in one piece, for example, the converting layer and a strip pattern formed thereon is printed or coated on the film in one piece. In another embodiment, the pattern is formed by attachment. In another embodiment, the contour or profile of the pattern can be configured by adjusting the mouth shape of output for forming the wavelength converting layer.

The material of the phosphor layer contains a binder, for example, the binder disclosed in U.S. patent application Ser. No. 11/940,845, and therefore the phosphor layer is attached on the film without applying an adhesive. In another embodiment, the pattern is attached on a substrate by adhesive.

Next, the prepared wavelength converting layer, that is, the substrate and the phosphor layer, is disposed in front of the emitting light path of the UVc lamp, and then the other optical structures are disposed on the substrate; wherein an adhesive layer is applied between layers if necessary.

The configuration of the pattern structure also relates to reducing mura effect. In one embodiment, the pattern is arranged according to the mura distribution of the lighting area. The parameters for deciding the configuration of the pattern comprising the dimension, distribution, selected material, density of distribution, the location of the wavelength converting layer mentioned above and etc. These manufacturing parameters can be controlled while performing manufacturing process of wavelength converting layer and then the pattern can be formed with the phosphor layer in one piece or formed in different pieces for combining with the phosphor layer later.

In another embodiment, the present invention discloses the wavelength converting layer comprising a layer for photo luminescent, a fluorescent color-conversion-media, an organic complex structure, a luminescent pigment(s), a quantum dots-based structure, a quantum wire-based structure, or a quantum well-based structure or the combination thereof, as long as the materials of the converting structure are suitable for converting incident light into aimed wavelength. The preparing and patterning of the wavelength converting layer is performed according to the known method or the preparing method disclosed above. For example, in another embodiment, the patterns can also be formed at the location other than the surface of the wavelength converting layer; the patterned structure can be disposed between any optical structures or on an optical structure as illustrated in FIG. 6 to FIG. 8. It is noteworthy that an adhesive, for example, PMA, is provided if it is necessary.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

The invention claimed is:

1. A patterned wavelength converting structure comprising:
   a light source;
   a substrate disposed upon said light source;
   a wavelength converter positioned over a surface of said substrate near said light source; and
   a pattern with a specific configuration positioned over one surface of said substrate for reducing the mura effect or affect of the distribution of non-uniformity of light, wherein said configuration of said pattern determines aimed luminance at a corresponding position of a lighting area.

2. The patterned wavelength converting structure of claim 1, wherein said pattern is positioned on one surface of said wavelength converter.

3. The patterned wavelength converting structure of claim 2, wherein said pattern and said wavelength converter is one piece.

4. The patterned wavelength converting structure of claim 1, wherein said configuration is the shape of said pattern.

5. The patterned wavelength converting structure of claim 4, wherein said shape is a strip, a collection of dots, or a combination thereof.

6. The patterned wavelength converting structure of claim 1, wherein said configuration is the thickness of said pattern.

7. The patterned wavelength converting structure of claim 1, wherein said configuration is the location of said pattern.

8. The patterned wavelength converting structure of claim 1, wherein the material character of said pattern also determines the aimed mura at the corresponding position of a lighting area.

9. The patterned wavelength converting structure of claim 8, wherein said character is the density distribution of diffusion particles of said material.

10. The patterned wavelength converting structure of claim 1, wherein said pattern is made by a phosphor material, a photo luminescent material, a fluorescent color-conversion-media, an organic complex material, a luminescent pigment(s), a quantum dots-based material, a quantum wire-based material, or a quantum well-based material, the combination thereof or the materials suitable for converting the incident light into aimed wavelength.

11. The patterned wavelength converting structure of claim 1, further comprising a first film positioned between said wavelength converter and said substrate.

12. The patterned wavelength converting structure of claim 11, wherein said pattern is positioned on one surface of said wavelength converter.

13. The patterned wavelength converting structure of claim 11, wherein said pattern is positioned on one surface of said first film.

14. The patterned wavelength converting structure of claim 11, further comprising a second film positioned on the surface of said substrate opposite to the surface facing said first film, and said pattern is positioned on one surface of said second film.

15. The patterned wavelength converting structure of claim 11, further comprising a second film positioned between said substrate and said first film, and said pattern is positioned between said second film and said second film.

16. The patterned wavelength converting structure of claim 11, wherein said first film is flexible.

17. The patterned wavelength converting structure of claim 14, wherein said first film, said second film or both are flexible.

18. The patterned wavelength converting structure of claim 15, wherein said first film, said second film or both are flexible.

19. The patterned wavelength converting structure of claim 1, further comprising an adhesive layer for fixing said first film.

20. The patterned wavelength converting structure of claim 14, further comprising an adhesive layer for fixing said first film, second film or both.

21. The patterned wavelength converting structure of claim 15, further comprising an adhesive layer for fixing said first film, second film or both.

* * * * *